(12) United States Patent
Downs et al.

(10) Patent No.: US 10,711,931 B2
(45) Date of Patent: Jul. 14, 2020

(54) COUPLING

(71) Applicant: Colder Products Company, St. Paul, MN (US)

(72) Inventors: Dennis Daniel Downs, Andover, MN (US); Gary James Harris, Maple Grove, MN (US); Grant Armin Wilhelm, Plymouth, MN (US)

(73) Assignee: Colder Products Company, St. Paul, MN (US)

( * ) Notice: Subject to any disclaimer, the term of this patent is extended or adjusted under 35 U.S.C. 154(b) by 0 days.

(21) Appl. No.: 16/240,132

(22) Filed: Jan. 4, 2019

(65) Prior Publication Data
US 2019/0137021 A1 May 9, 2019

Related U.S. Application Data

(63) Continuation of application No. 29/603,021, filed on May 5, 2017, now Pat. No. Des. 838,350, which is a
(Continued)

(51) Int. Cl.
*F16L 37/084* (2006.01)
*F16L 37/35* (2006.01)
(Continued)

(52) U.S. Cl.
CPC .......... *F16L 37/0841* (2013.01); *B60K 15/01* (2013.01); *F16L 37/35* (2013.01); *B60K 15/03519* (2013.01); *B60K 2015/03256* (2013.01); *B60K 2015/03453* (2013.01); *B60K 2015/0496* (2013.01); *Y10T 137/9029* (2015.04)

(58) Field of Classification Search
USPC ....................................... 137/614.03, 614.05
See application file for complete search history.

(56) References Cited

U.S. PATENT DOCUMENTS

| 592,899 A | 11/1897 | Wilson |
| 4,070,003 A | 1/1978 | Shames et al. |
| (Continued) | | |

FOREIGN PATENT DOCUMENTS

| DE | 1298378 | 6/1969 |
| DE | 20011308 | 12/2000 |
| (Continued) | | |

OTHER PUBLICATIONS

International Search Report and Written Opinion in Application No. PCT/US2012/059958, dated Jan. 18, 2013, 11 pages.
(Continued)

*Primary Examiner* — Angelisa L. Hicks
(74) *Attorney, Agent, or Firm* — Fish & Richardson P.C.

(57) ABSTRACT

A system includes a body with a fluid passage therethrough, a first open end, and an opposite termination, a valve positioned within the body and including first and second ends, the valve moving between open and closed positions, the valve being biased into the closed position, and a seal positioned on the second end of the valve, the seal forming the closed position when the valve is biased towards the first open end of the body, and the seal engaging a shoulder formed by the body to retain the valve within the body. The seal is accessible from the termination of the body to allow the valve to be coupled to the body.

16 Claims, 21 Drawing Sheets

Figure 1A:
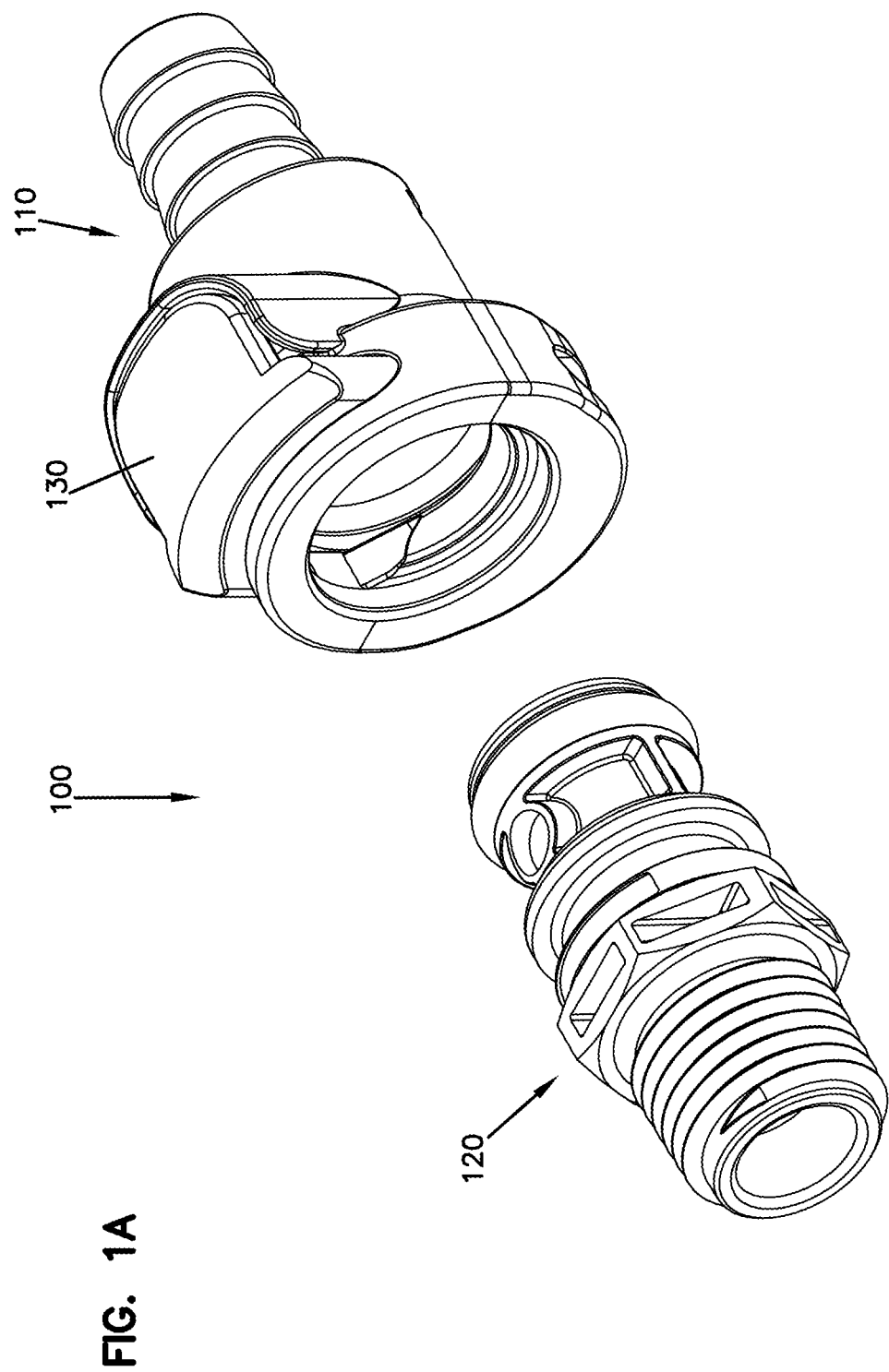

Related U.S. Application Data continuation of application No. 29/553,778, filed on Feb. 4, 2016, now Pat. No. Des. 788,890, which is a continuation of application No. 13/650,914, filed on Oct. 12, 2012, now abandoned.

(51) Int. Cl.
*B60K 15/01* (2006.01)
*B60K 15/03* (2006.01)
*B60K 15/035* (2006.01)
*B60K 15/04* (2006.01)

(56) References Cited

U.S. PATENT DOCUMENTS

| | | | |
|---|---|---|---|
| 4,124,228 A * | 11/1978 | Morrison | F16L 37/23 |
| | | | 137/614.03 |
| 4,469,136 A | 9/1984 | Watkins | |
| 4,541,457 A | 9/1985 | Blenkush | |
| D313,607 S | 1/1991 | Moore | |
| D315,400 S | 3/1991 | Medvick | |
| D357,307 S | 4/1995 | Ramacier | |
| 5,765,612 A | 6/1998 | Morin | |
| 5,845,943 A | 12/1998 | Ramacier et al. | |
| 6,024,124 A | 2/2000 | Braun et al. | |
| D463,537 S | 9/2002 | Kozu | |
| 6,758,457 B2 | 7/2004 | Nicolino et al. | |
| 6,837,262 B2 | 1/2005 | Cortez et al. | |
| 6,895,952 B1 | 5/2005 | Bachelder | |
| D521,614 S | 5/2006 | Kitagawa | |
| 7,469,472 B2 | 12/2008 | deCler et al. | |
| 7,571,937 B2 | 8/2009 | Patel | |
| D627,039 S | 11/2010 | Yu | |
| 7,836,912 B2 * | 11/2010 | Jang | H01M 8/04201 |
| | | | 137/614.03 |
| D629,891 S | 12/2010 | Virr et al. | |
| D638,933 S | 5/2011 | Hill et al. | |
| D639,398 S | 6/2011 | Wilhelm | |
| D642,244 S | 7/2011 | Wilhelm | |
| D654,573 S | 2/2012 | Lombardi et al. | |
| 8,256,743 B2 | 9/2012 | Tiberghien et al. | |
| 8,356,794 B1 | 1/2013 | Liu | |
| D679,784 S | 4/2013 | Meyer | |
| D687,528 S | 8/2013 | Meyer | |
| 8,764,068 B2 | 7/2014 | Frick et al. | |
| 8,807,601 B2 | 8/2014 | Anderson | |
| D724,703 S | 3/2015 | Downs | |
| D742,508 S | 11/2015 | Row et al. | |
| D746,953 S | 1/2016 | Gledhill | |
| D751,674 S | 3/2016 | Gledhill | |
| D758,555 S | 6/2016 | Van Dyke | |
| 2004/0056481 A1 | 3/2004 | Do | |
| 2005/0012330 A1 | 1/2005 | Schmidt | |
| 2005/0101939 A1 * | 5/2005 | Mitchell | A61M 39/10 |
| | | | 604/533 |
| 2007/0025811 A1 | 2/2007 | Wilhelm | |
| 2010/0019487 A1 | 1/2010 | deCler et al. | |
| 2010/0276922 A1 * | 11/2010 | Rehder | F16L 37/0841 |
| | | | 285/26 |
| 2013/0092271 A1 | 4/2013 | Downs et al. | |
| 2014/0060675 A1 | 3/2014 | Wilhelm et al. | |

FOREIGN PATENT DOCUMENTS

| | | |
|---|---|---|
| EP | 0200561 | 11/1986 |
| WO | WO 2008008392 | 1/2008 |

OTHER PUBLICATIONS

International Preliminary Report on Patentability in Application No. PCT/US2012/059958, dated Apr. 15, 2014, 7 pages.
Colder Products Company, Catalog, "Cleaner, Faster, Safer, Smarter Colder, first in choice in couplings," Oct. 2007, 4 pages.
Colder Products Company, Product Line Overview, "Quick Couplings and Fillings for Plastic Tubing," 2004, 5 pages.

* cited by examiner

COUPLING

RELATED APPLICATION(S)

This application is a continuation of U.S. application Ser. No. 29/603,021, filed May 5, 2017, which is a continuation of U.S. application Ser. No. 29/553,778, filed Feb. 4, 2016 (now D788,890), which is a continuation of U.S. application Ser. No. 13/650,914, filed Oct. 12, 2012, the entirety of which is hereby incorporated by reference.

BACKGROUND

Quick disconnect couplings are used in various applications to connect two lines to create a fluid pathway therethrough. The couplings typically include cooperating male and female couplings that form the connection. A latch is used to connect the male and female couplings. An example of such a coupling is shown in U.S. Pat. No. 5,104,158 filed on May 31, 1991, the entirety of which is hereby incorporated by reference.

Various components on the couplings can move to accomplish the connection therebetween. For example, a latch of the female coupling (or body) typically moves within the female coupling to connect the female coupling to the male coupling (or insert). Also, the male coupling is typically at least partially received within the female coupling to accomplish the connection.

SUMMARY

Aspects of the present disclosure relate to systems and methods for forming couplings. In one aspect, a female coupling includes a body defining a fluid pathway therethrough, and a slot extending transversely with respect to the fluid pathway, and a latch positioned in the slot to move between locked and unlocked positions. A mating male coupling defining a fluid pathway forms the complete coupling.

DRAWINGS

Figure 1B:
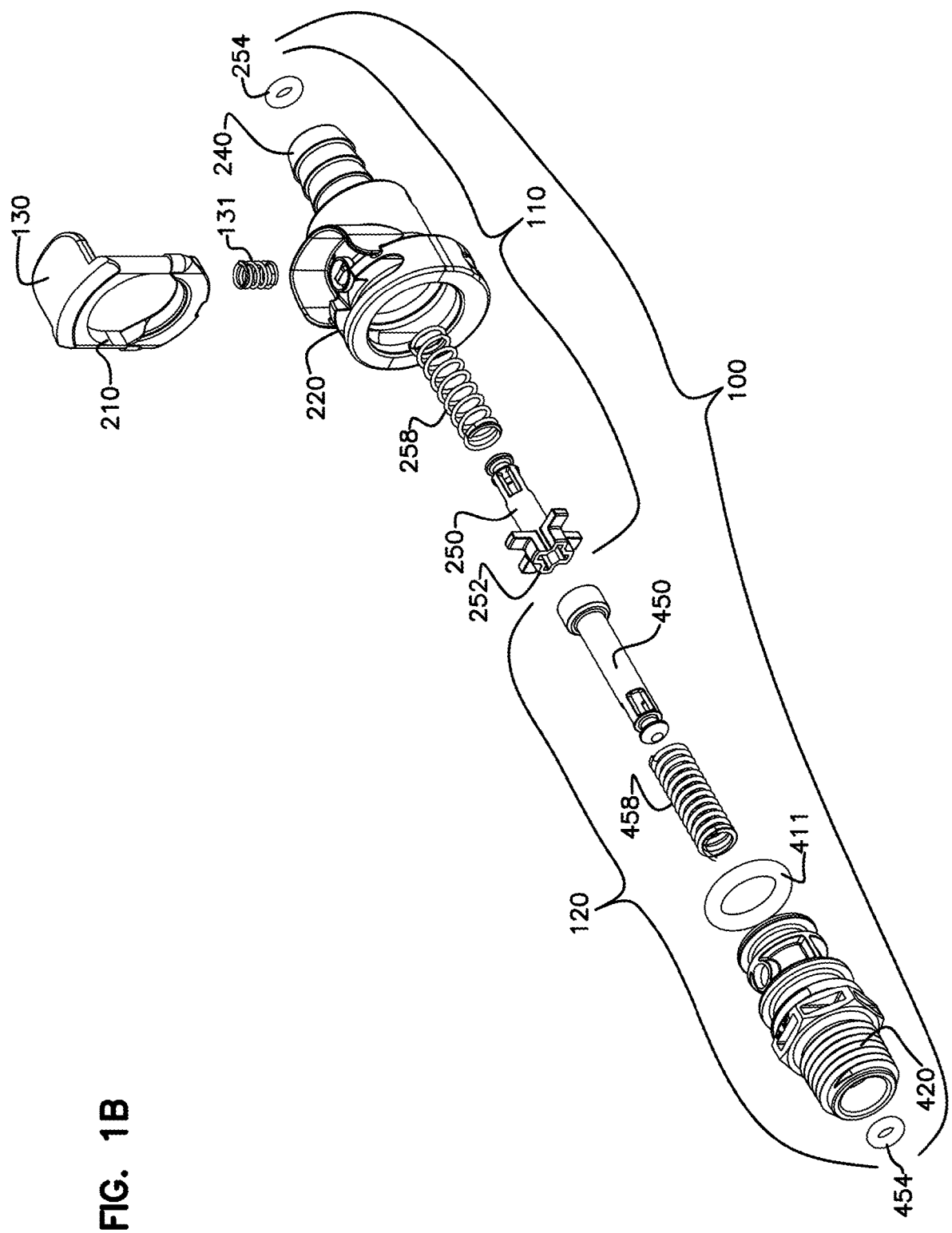
Figure 2:
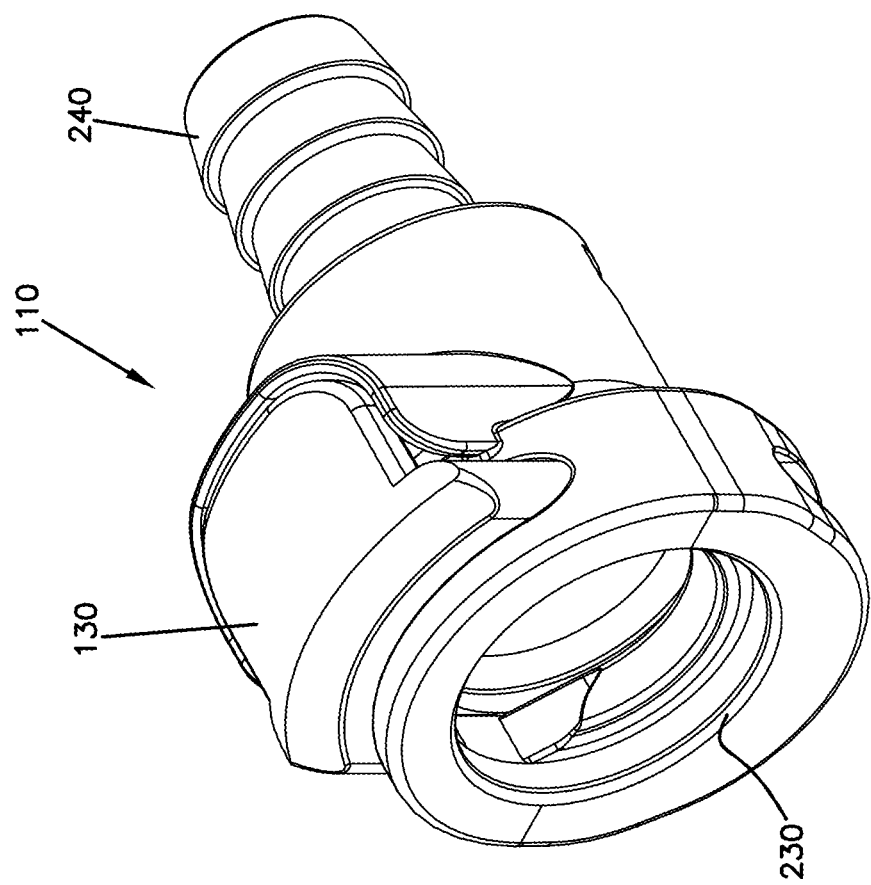
Figure 3:
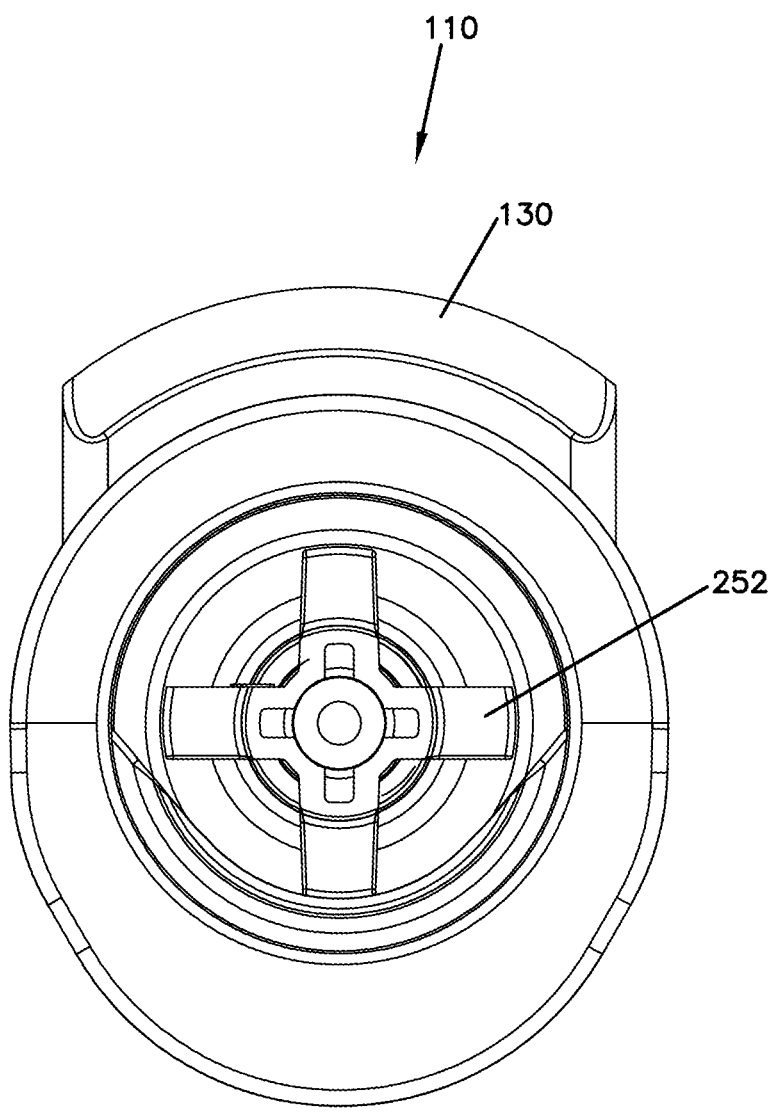
Figure 4:
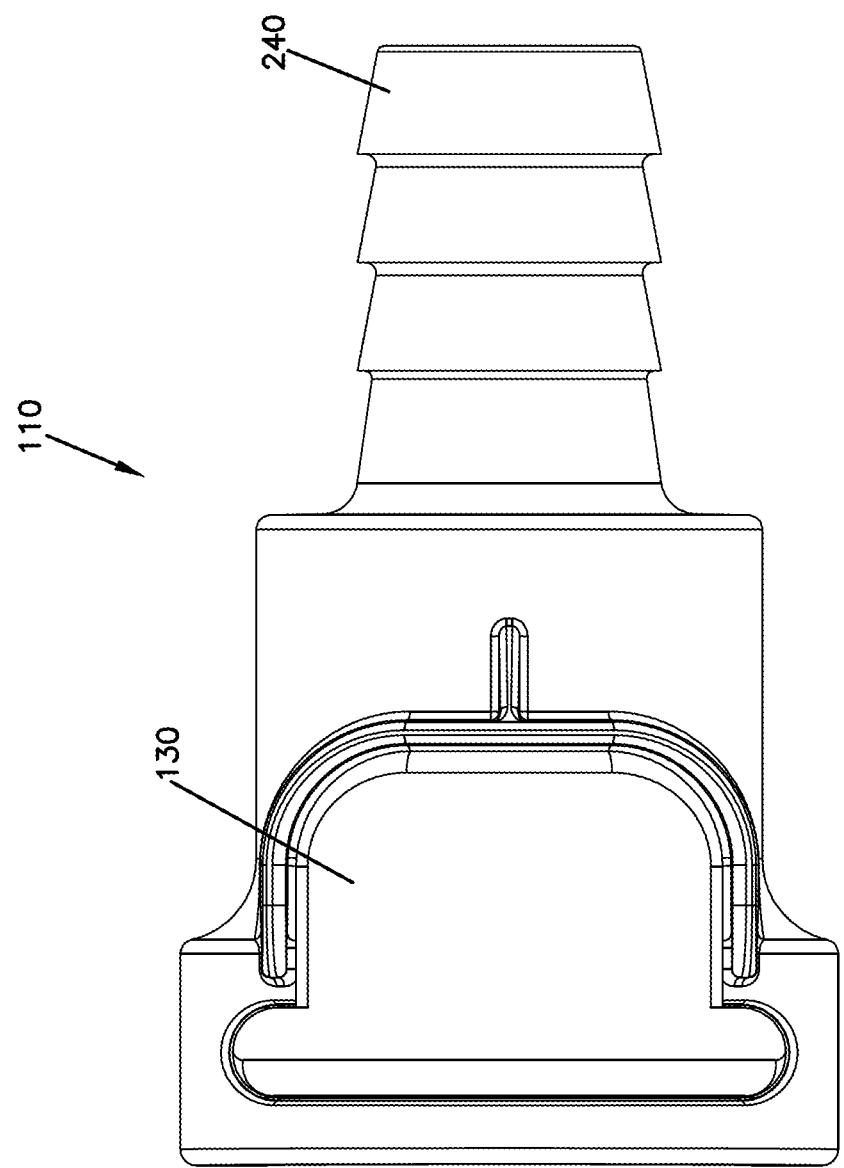
Figure 5:
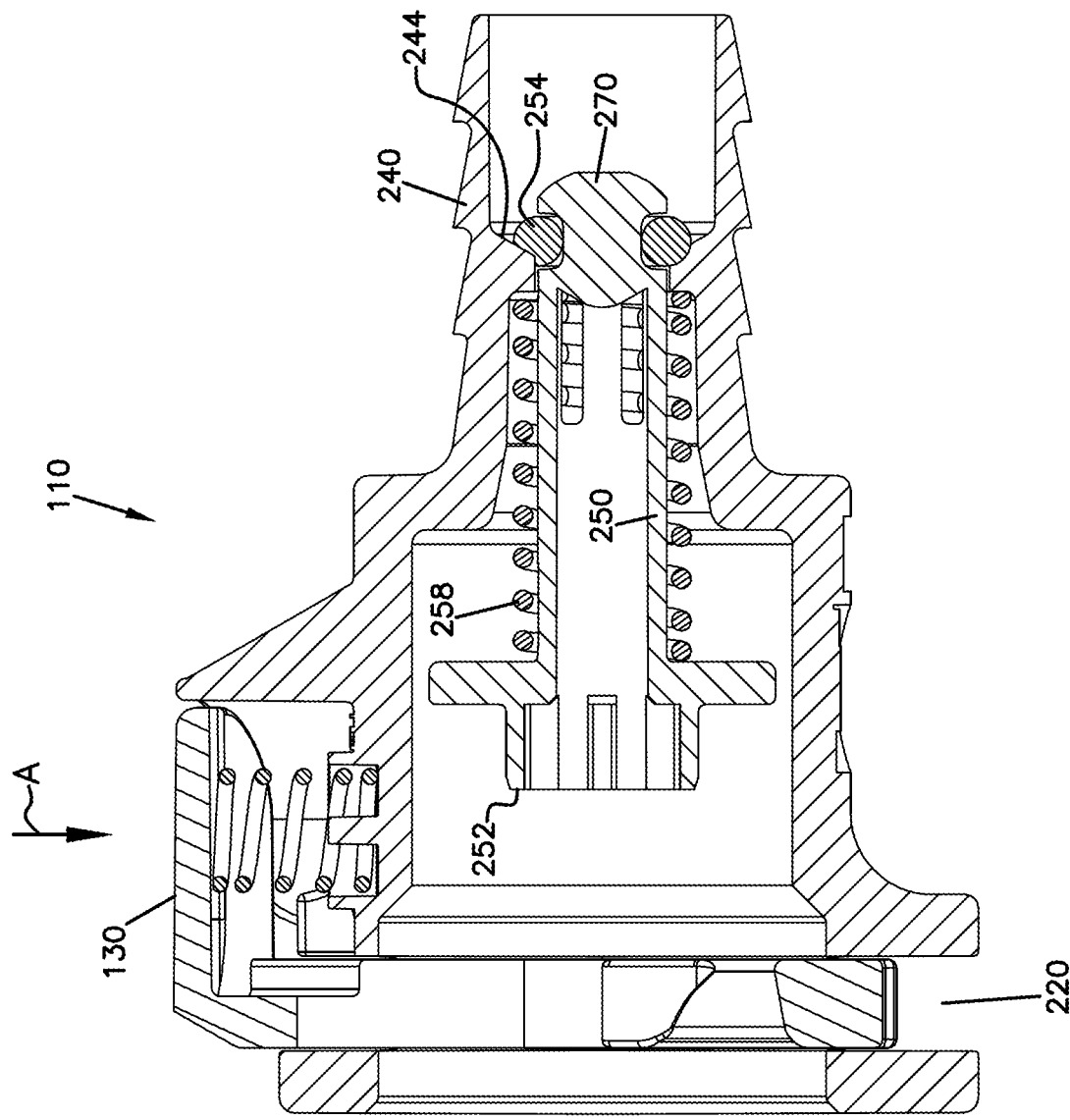
Figure 6:
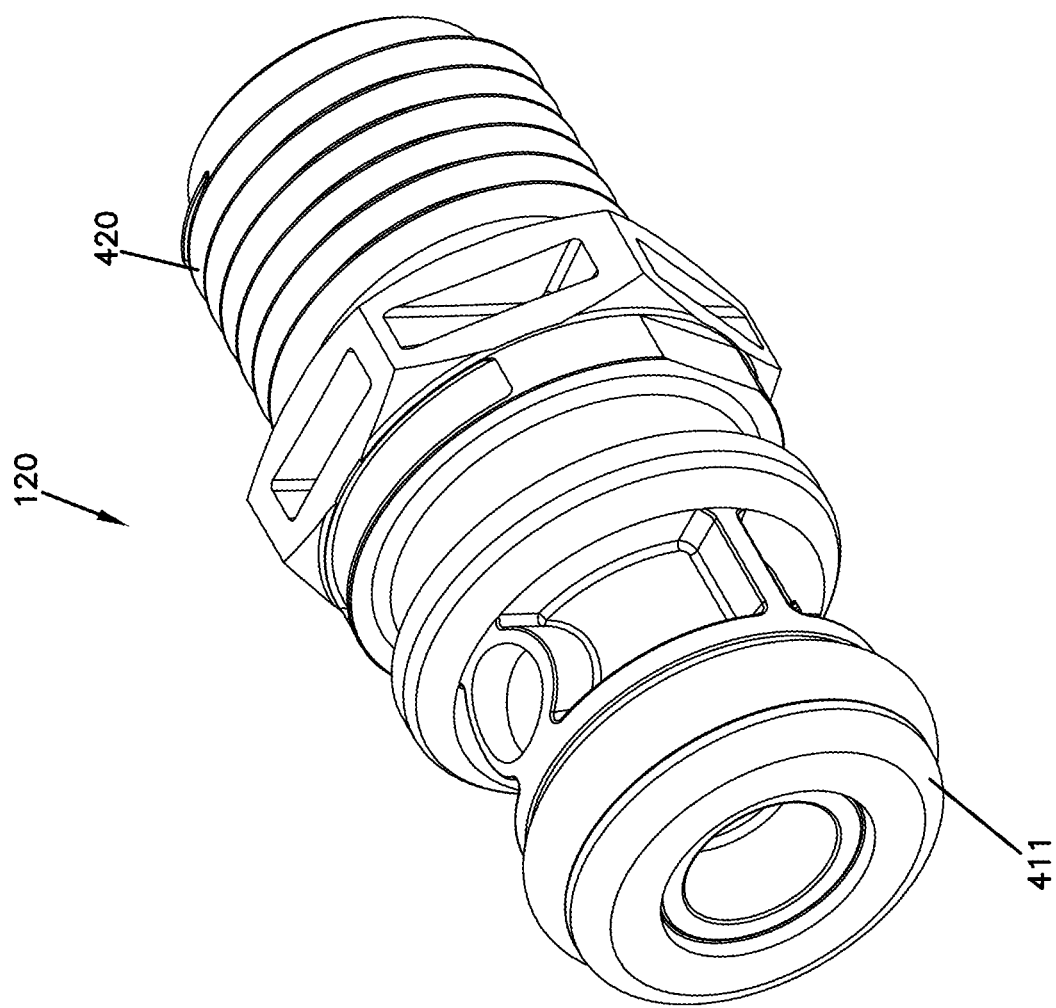
Figure 7:
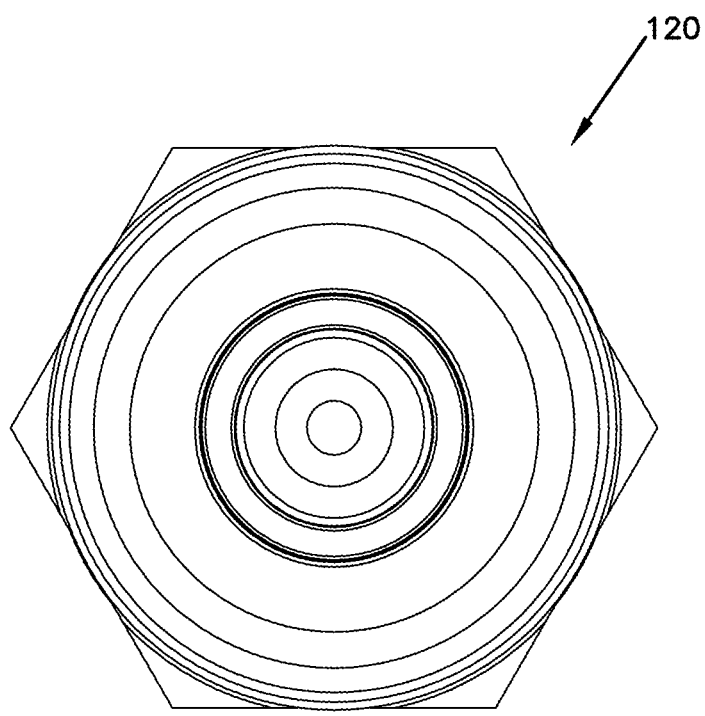
Figure 8:
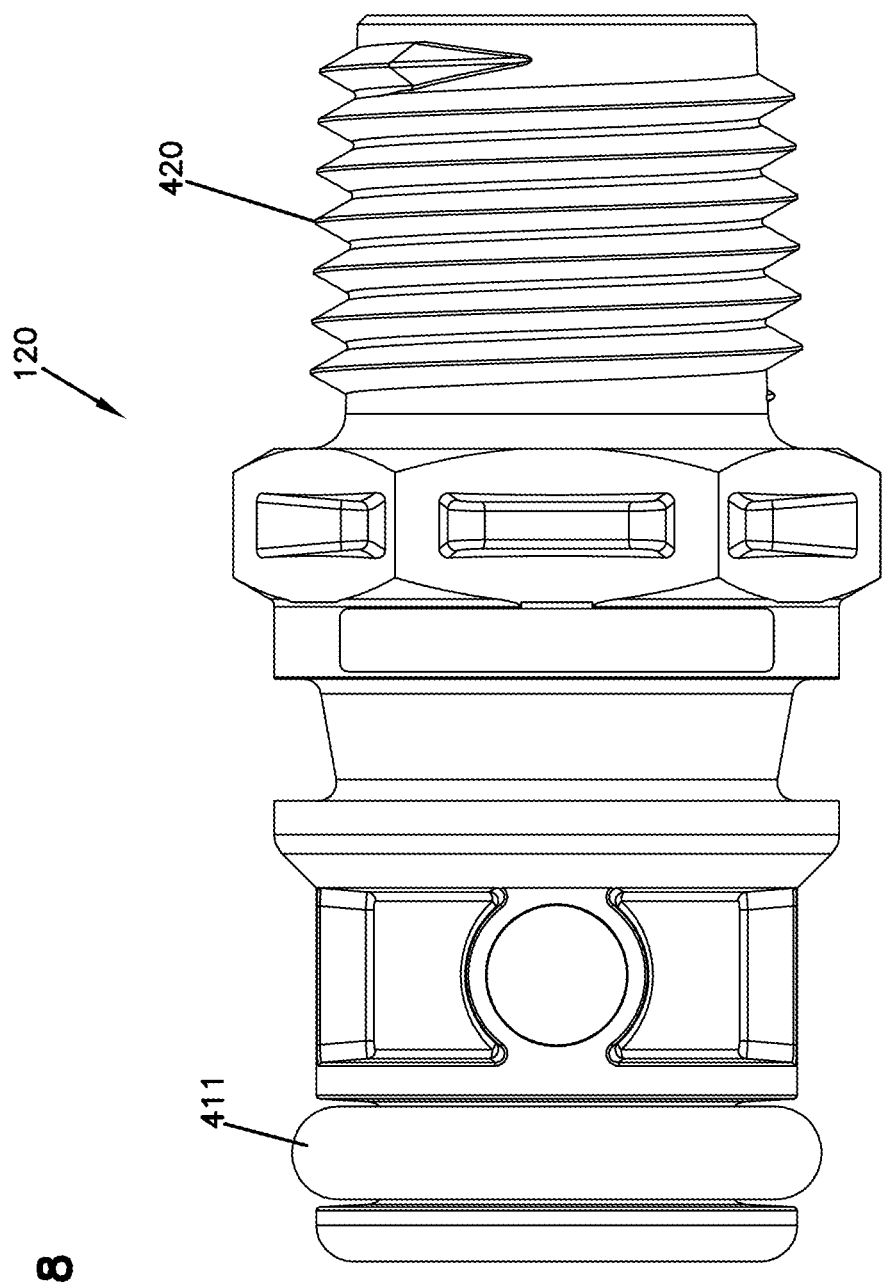
Figure 9:
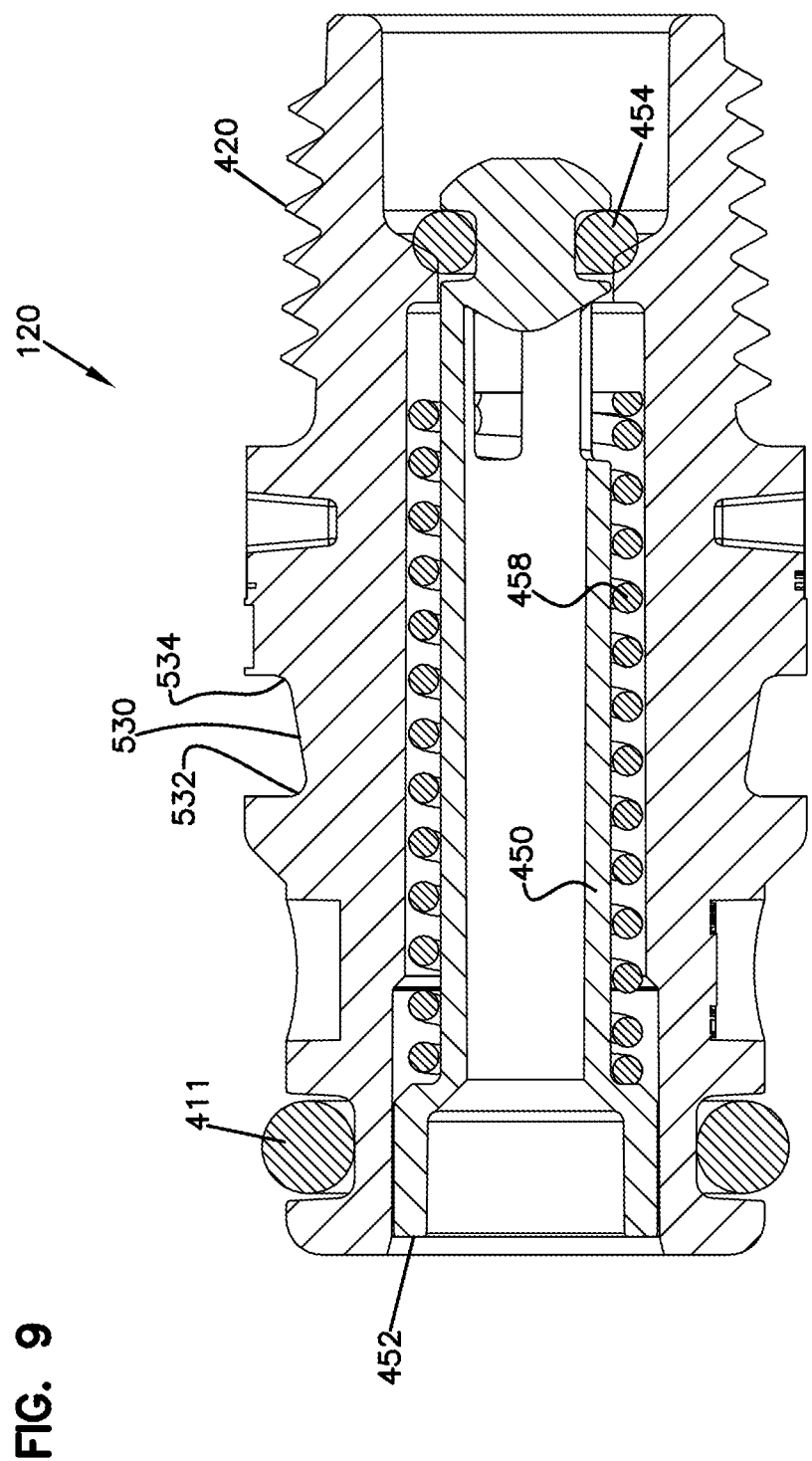
Figure 10:
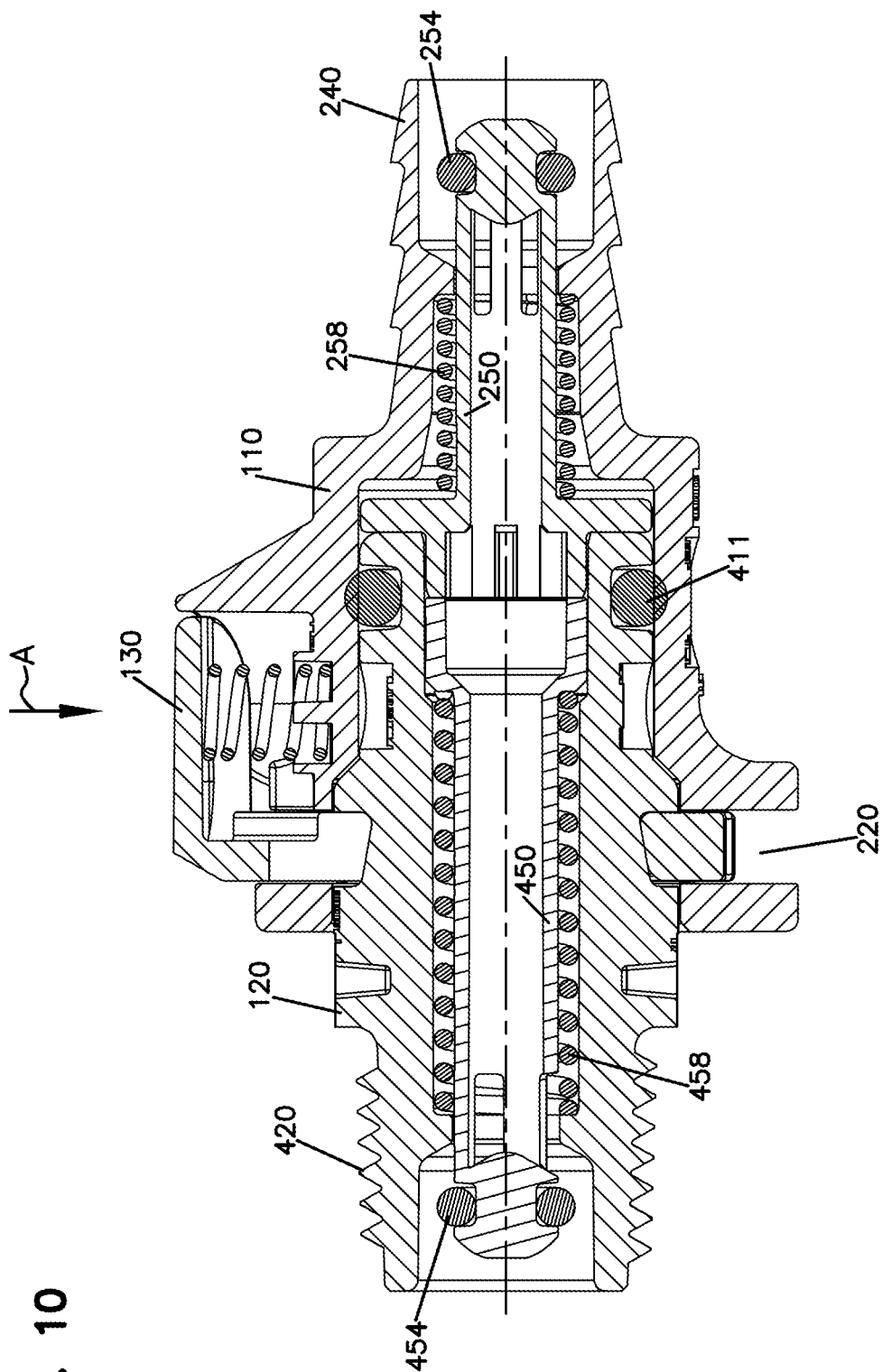
Figure 11:
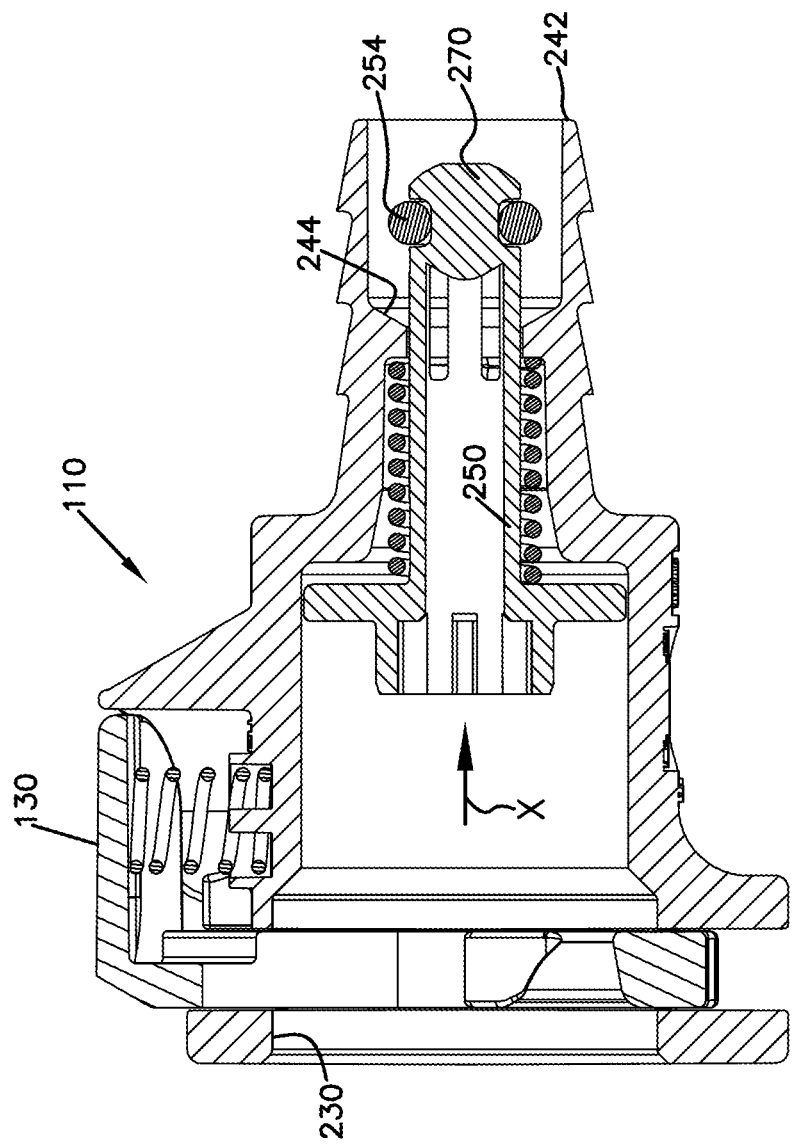
Figure 12:
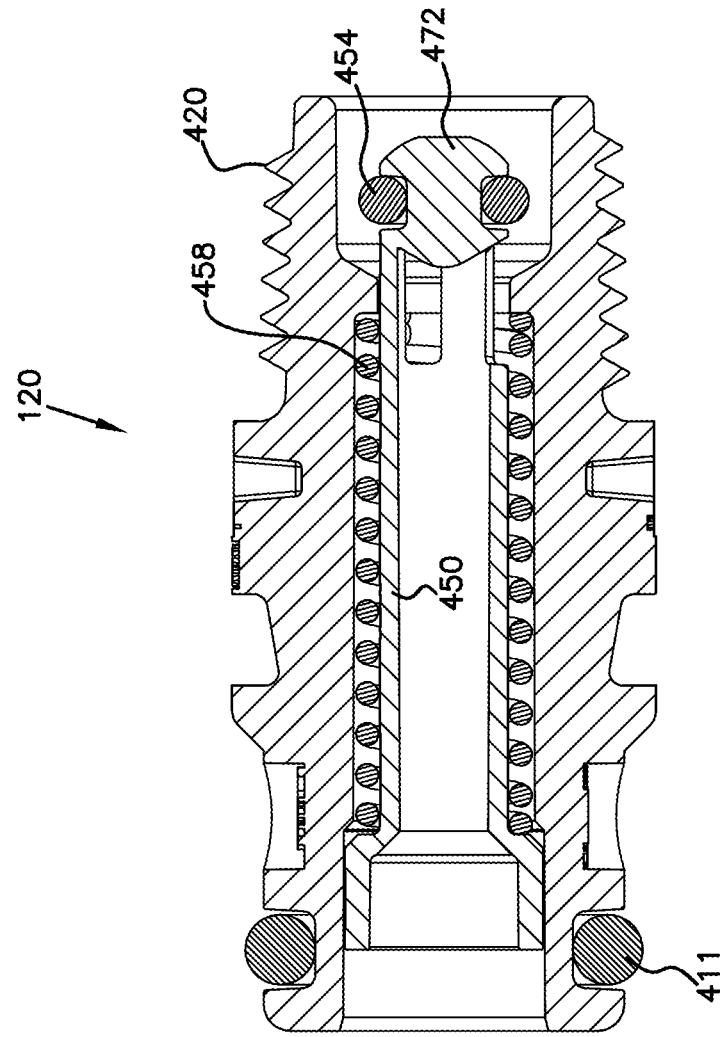
Figure 13:
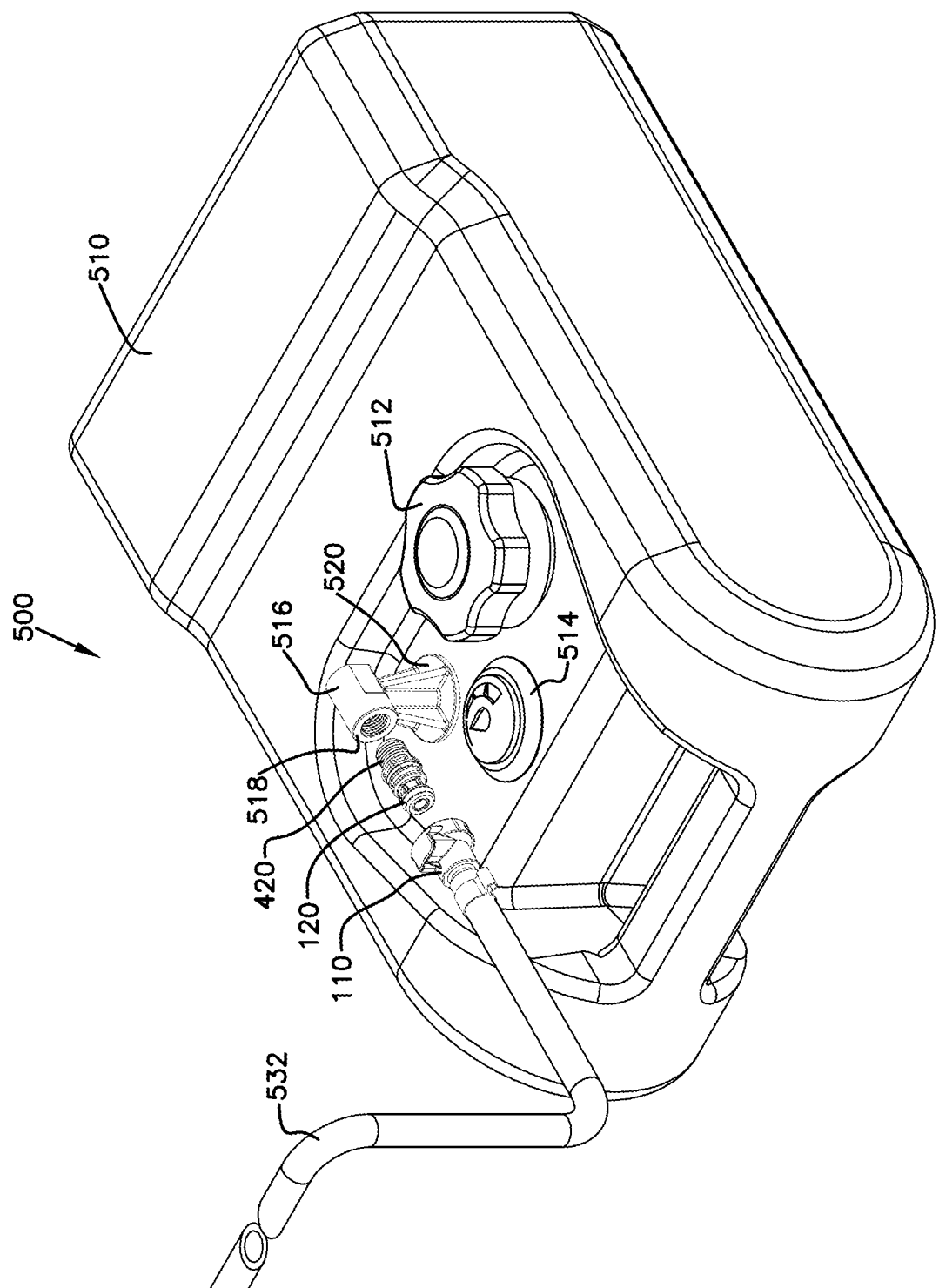
Figure 14:
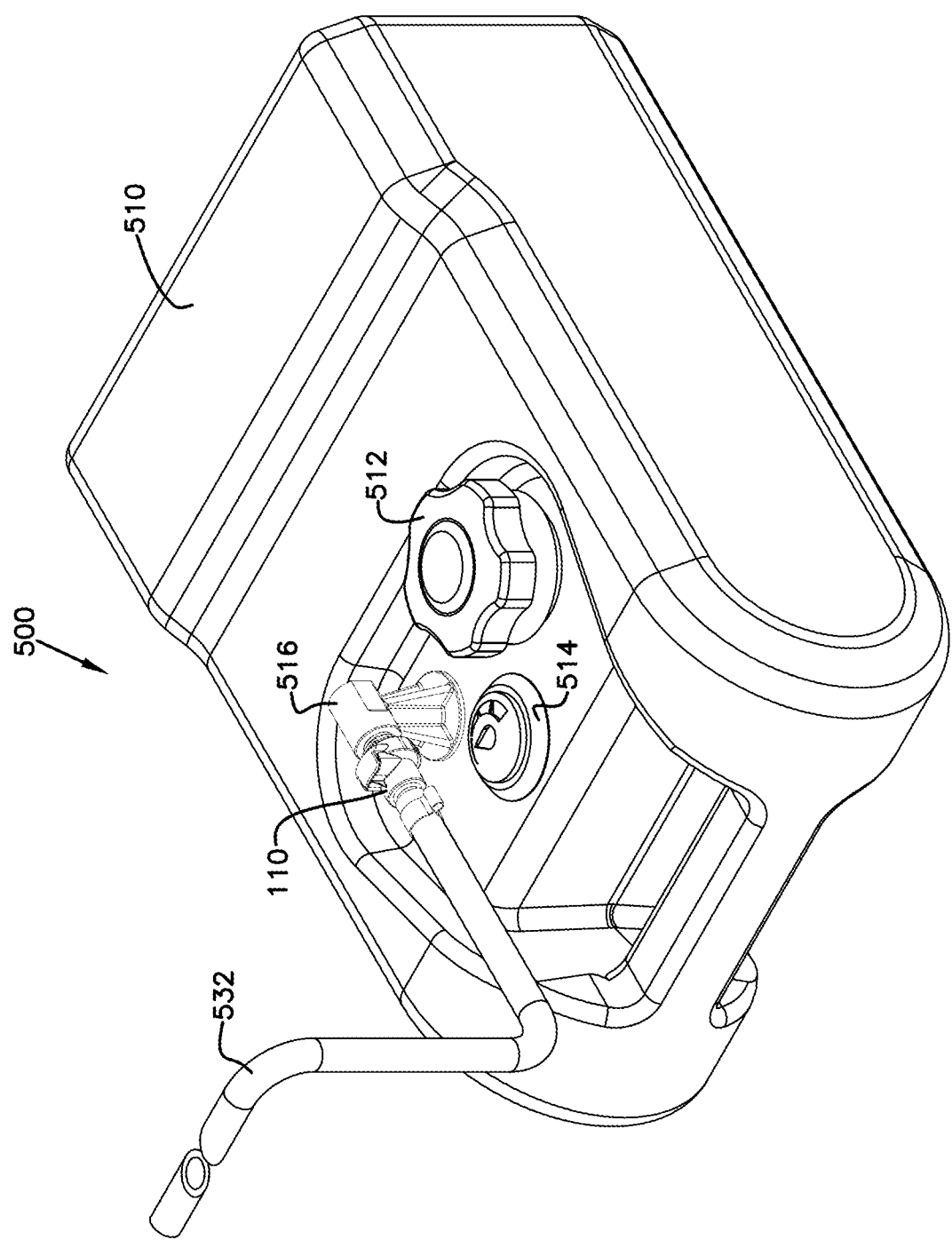
Figure 15:
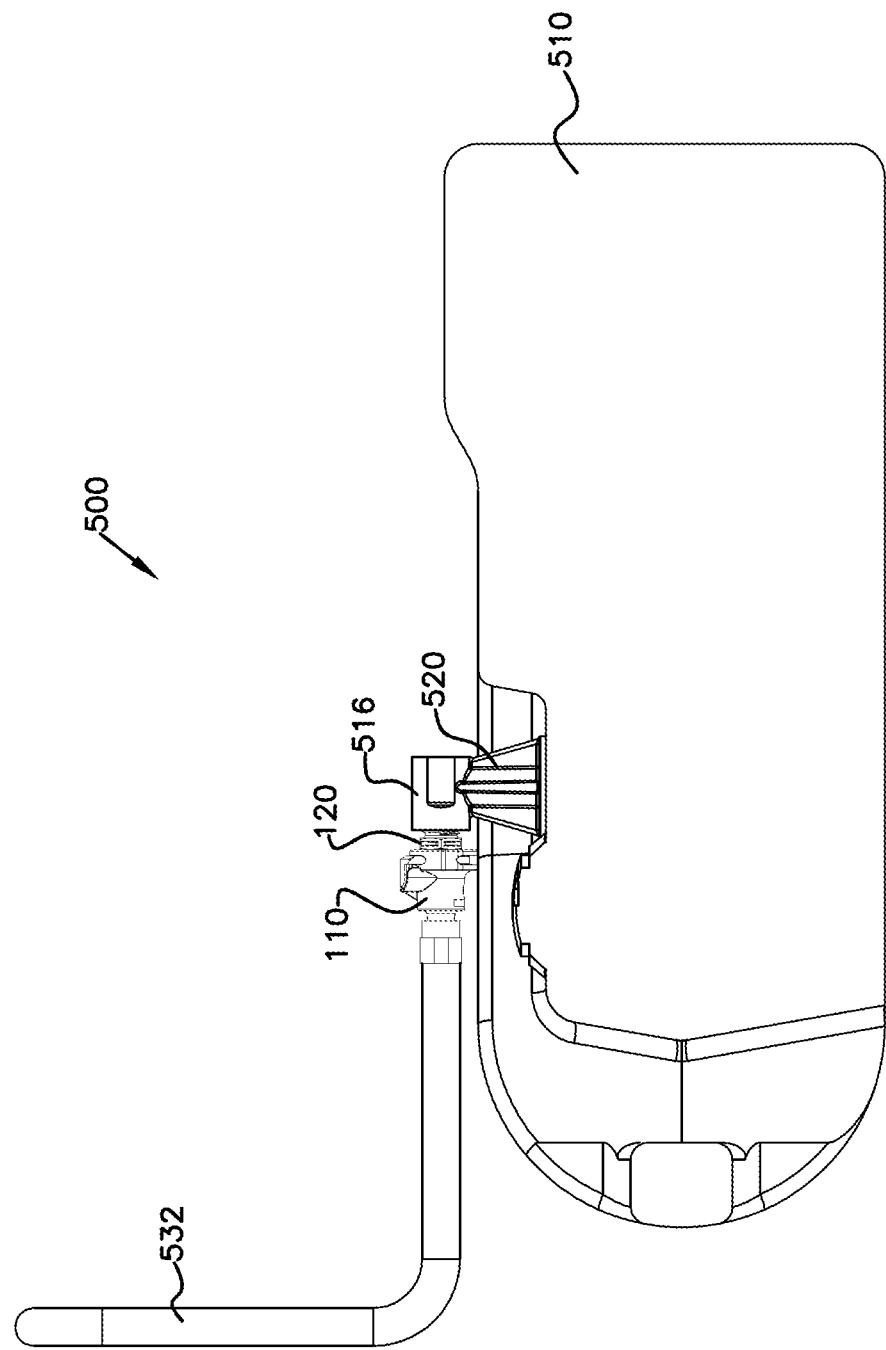
Figure 16:
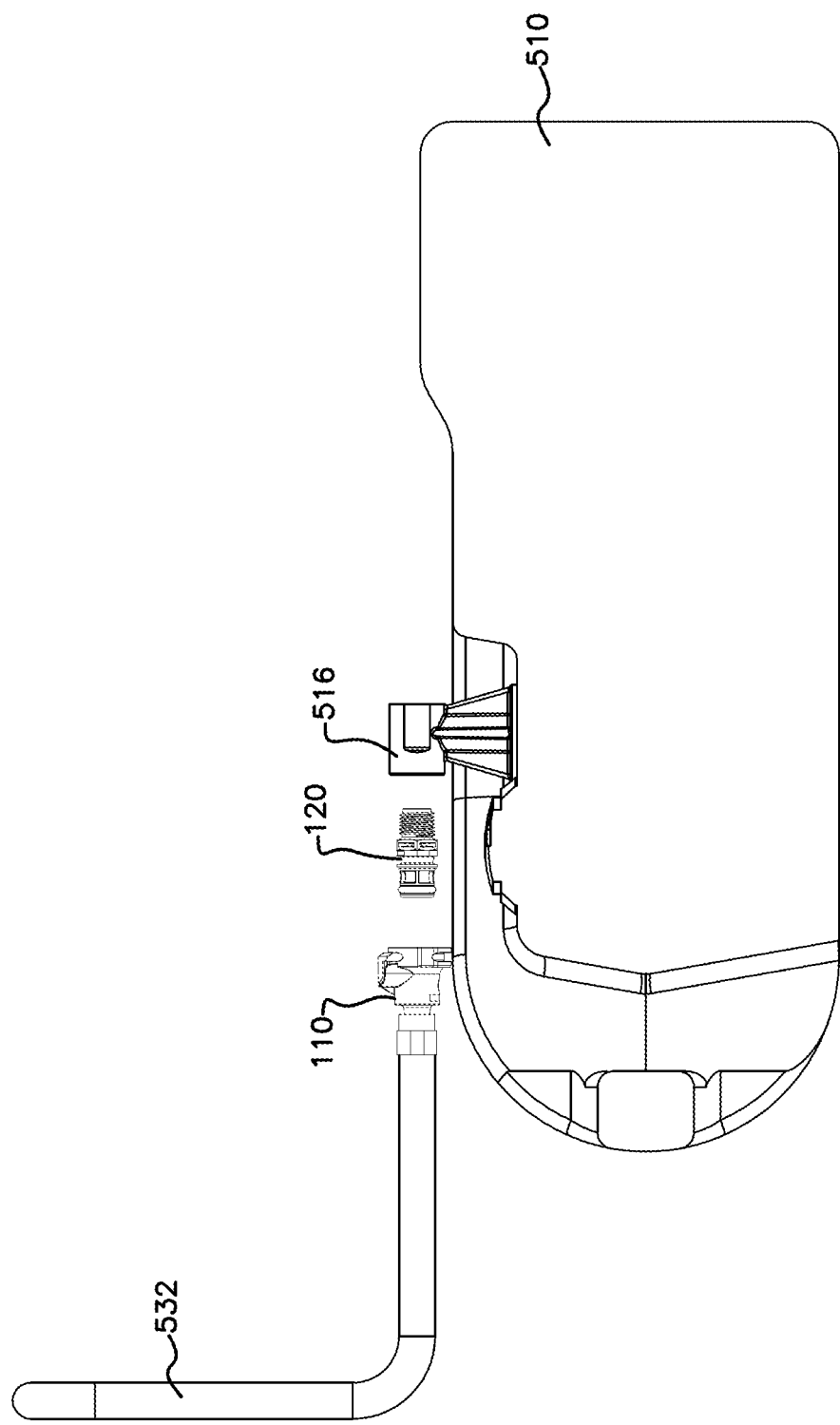
Figure 17:
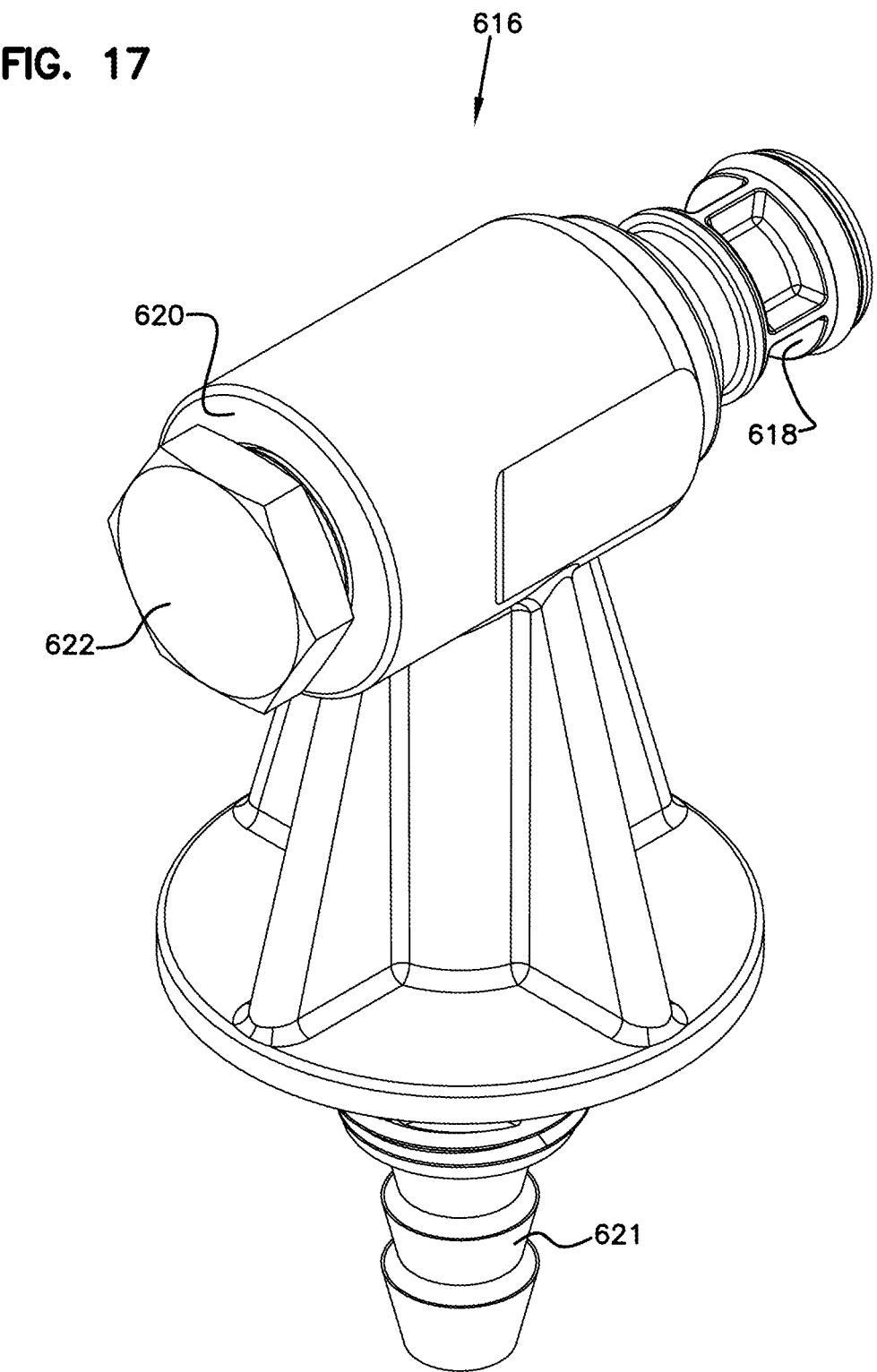
Figure 18:
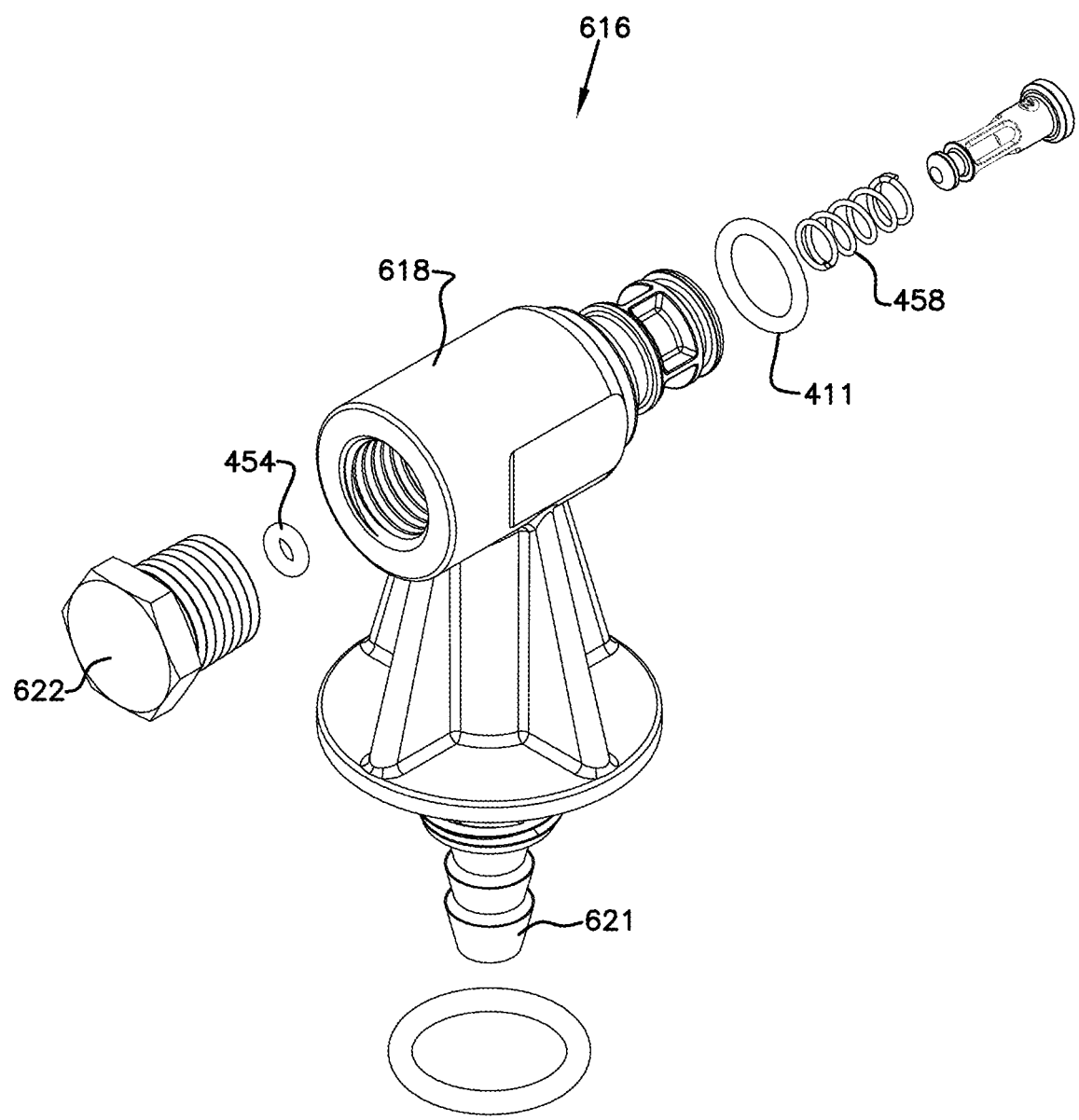
Figure 19:
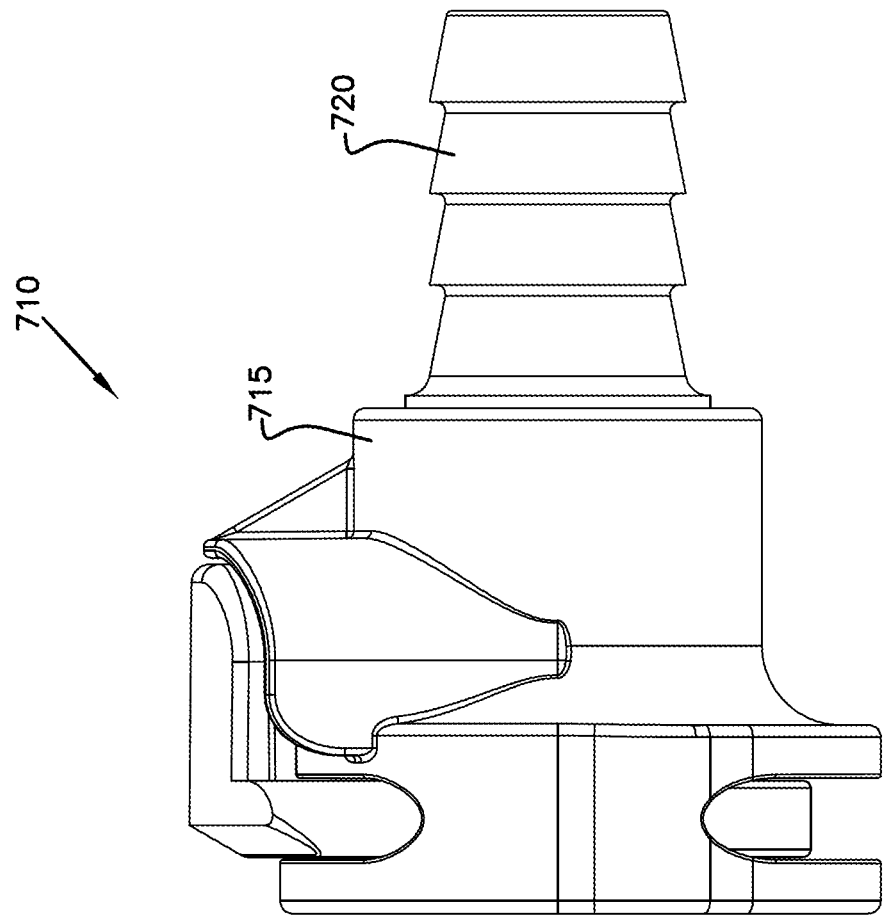
Figure 20:
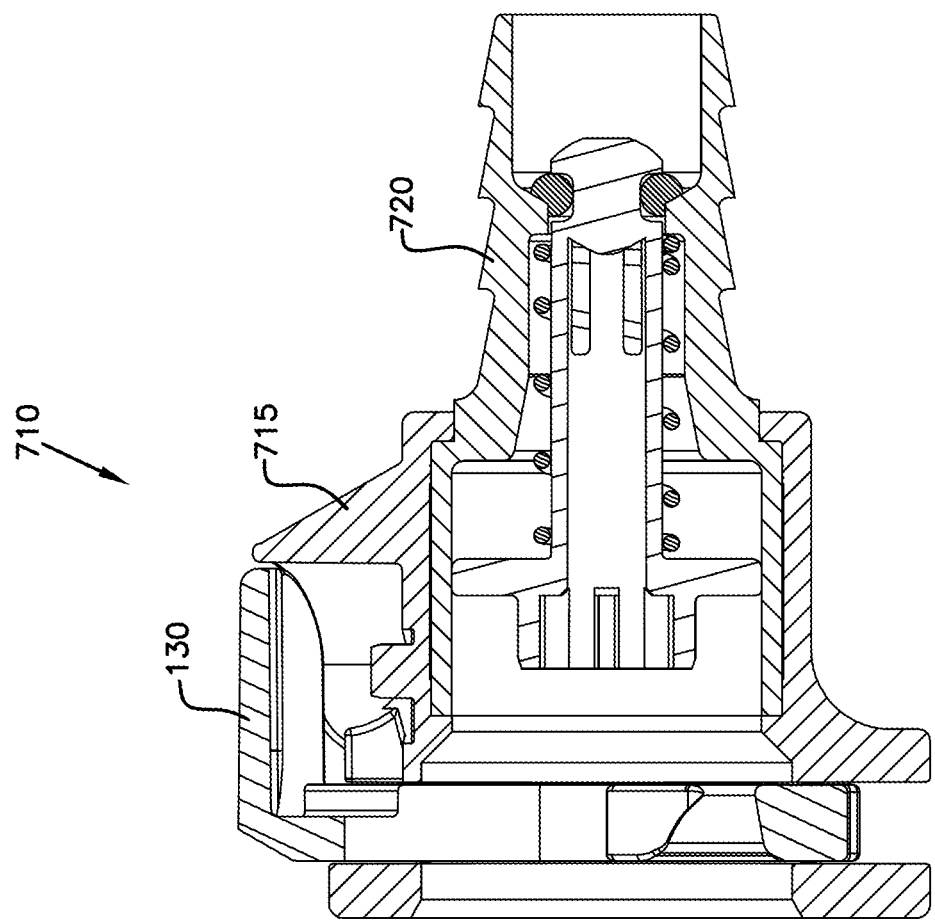

FIG. 1A is a perspective view of an example coupling.
FIG. 1B is an exploded perspective view of the coupling of FIG. 1A.
FIG. 2 is a perspective view of an example body of the coupling of FIG. 1A.
FIG. 3 is a front view of the body of FIG. 2.
FIG. 4 is a top view of the body of FIG. 2.
FIG. 5 is a cross-sectional view of the body of FIG. 2.
FIG. 6 is perspective view of an example insert of the coupling of FIG. 1A.
FIG. 7 is a front view of the insert of FIG. 6.
FIG. 8 is a top view of the insert of FIG. 6.
FIG. 9 is a cross-sectional view of the insert of FIG. 6.
FIG. 10 is a cross-section view of the coupling of FIG. 1A.
FIG. 11 is a cross-sectional view of the body of FIG. 2 during assembly.
FIG. 12 is a cross-sectional view of the insert of FIG. 6 during assembly.
FIG. 13 is a perspective view of an example system including the coupling of FIG. 1A.
FIG. 14 is another perspective view of the system of FIG. 13.
FIG. 15 is a side view of the system of FIG. 13.
FIG. 16 is another perspective view of the system of FIG. 13.
FIG. 17 is a perspective view of an example fluid supply module.
FIG. 18 is an exploded perspective view of the fluid supply module of FIG. 17.
FIG. 19 is a side view of another embodiment of a body including two materials.
FIG. 20 is a perspective view of the body of FIG. 19.

DETAILED DESCRIPTION

This application is directed to systems and methods for forming couplings.

FIGS. 1A and 1B show an example coupling 100 including a body 110 (sometimes referred to as a female coupling) and an insert 120 (sometimes referred to as a male coupling).

In the example shown, the insert 120 is being coupled to the body 110 by a clip or latch 130. The body 110 and the insert 120 together form a fluid passage way therethrough. The latch 130 moves in a direction that is generally transverse to the longitudinal direction of the fluid pathway to couple the body 110 and the insert 120, as described further below.

Referring now to FIGS. 2-5, the body 110 is shown. The body 110 includes an opening 230 into which the insert 120 is inserted. The latch 130 includes a main body 210 that moves within a slot 220. In FIG. 2, the latch 130 is in a resting or locked position. The latch 130 can be biased or forced into the locked position using an integral cantilever or spring 131. The latch 130 is moved in a direction A within the slot 220 of the body 110 to an unlocked position. The latch 130 can be moved to this position to, for example, connect or release the portion of the insert 120 that is introduced through the latch 130.

The body 110 houses a valve 250 positioned therein. The valve 250 is biased by a spring 258 to a closed position as shown in FIG. 5. Upon mating with the insert 120, the valve 250 is moved backwards to an open position so fluid can flow therethrough. The body 110 also includes a termination 240. In this example, the termination 240 is a barbed termination that can be secured to a conduit, as described below. Other terminations can be used. For example, in an alternative design, the termination can be a separate part that is joined to the body.

Referring now to FIGS. 6-9, the insert 120 is shown. The insert 120 includes a front portion 410 and a termination portion 420. The front portion 410 can be inserted into the opening 230 in the body 110 and through the latch 130 to couple the insert 120 to the body 110 and to form the fluid pathway therethrough. A seal 411 seals the insert 120 within the inner diameter of the body 110. See FIG. 10, described below. The termination portion 420 remains outside the body 110 so that the termination portion 420 can be connected to another structure, such as a container or a conduit containing a fluid (e.g., liquid or gas).

The insert 120 houses a valve 450 positioned therein. The valve 450 is biased by a spring 458 to a closed position as shown in FIG. 9. Upon mating with the body 110, the valve 450 is moved backwards to an open position so that fluid can flow therethrough.

Referring now to FIG. 10, the body 110 and the insert 120 are shown in the coupled state. In this state, the valves 250, 450 are in the open positions so that fluid can flow therethrough. During mating of the body 110 and the insert 120, the valves 250, 450 contact and push against one another to move the valves 250, 450 backwards to open the fluid path as shown.

In this example, front portions 252, 452 of the valves 250, 450 form a "make before you break" connection, in that a seal 254 on the valve 250 and a seal 454 on the valve 450 are unseated after the valves 250, 450 are coupled so that there is little or no loss of any fluid flowing through the coupling 100 when the body 110 and the insert 120 are uncoupled.

When coupled as shown in FIG. 10, the latch 130 is accepted into a latch groove 530 formed on the insert 120. See FIGS. 9 and 10. In this example, the latch groove 530 is angled from a beginning 532 to an end 534 of the latch groove 530. Specifically, the latch groove 530 forms a smaller outer diameter at the beginning 532 and a larger outer diameter at the ending 534. This generally forms a slope for the latch groove 530. In other examples, the slope can be more or less pronounced or can be formed in other configurations, such as stepped, etc. A corresponding structure 135 on the latch 130 can be configured in a complementary shape, or can simply be formed in a different geometry, such as a flat portion without any slope.

One possible advantage of forming the latch groove 530 in this manner is that there is additional material forming the insert 120 at the end 534 of the latch groove 530. This material can function to strengthen the insert 120 at this juncture and help resist breakage of the insert 120 at the latch groove 530.

Referring to FIGS. 11 and 12, the body 110 and the insert 120 can be assembled as follows. Initially, the body 110 and the insert 120 can be molded using a known technique, such as injection molding, using a polymeric material such as acetal, nylon, polypropylene, acrylonitrile butadiene styrene, polycarbonate, polysulfone, etc. The valves 250, 450 can be formed in a similar manner. Other techniques, such as metal injection molding and/or machining, can also be used.

Next, for the body 110, the spring 258 is placed on the valve 250, and the valve 250 is introduced into the opening 230 formed in the body 110. The valve 250 is compressed in a direction X against the spring 258 until in the position shown in FIG. 11. In this position, an end 270 of the valve 250 is accessible from an opening 242 formed in the termination 240 so that the seal 254 can be placed in a seal groove 272 formed in the end 270 of the valve 250. In this example, the seal 254 is an O-ring.

Once the seal 254 is in position, the valve 250 can be released, allowing the spring 258 to force the valve 250 forward until the seal 254 engages a shoulder 244 formed in the termination 240. In this position, the seal 254 resists further forward biasing by the spring 258 so that the valve 250 is retained in the body 110. In addition, with the seal 254 engaging the shoulder 244, fluid flow through the body 110 is stopped.

The insert 120 is similarly assembled by forcing the valve 450 and the spring 458 through the insert 120 until a seal groove 472 is accessible through the termination portion 420. The seal 454 is then placed in the seal groove 472 to maintain the valve 450 within the insert 120 and to seal the insert 120 when the valve 450 is in the closed position.

Referring now to FIGS. 13-16, an example system 500 incorporating the body 110 and the insert 120 is shown.

In this example, the system 500 includes a container 510 that is sized to hold a fluid, such as gasoline or another fuel. In this example, the container 510 is used as a source of fuel for a boat or other vehicle. Other configurations are possible.

The container 510 includes a cap 512 that can be rotated to affix or remove the cap 512 from the container 510. The cap 512 can be removed to introduce additional fluid into the container 510. Once filled, the cap 512 is replaced to maintain the fluid in the container 510.

The container 510 also includes a vent 514 configured to maintain the interior of the container 510 at a given pressure. For example, the vent 514 can be configured to let fluid (e.g., air) into and/or out of the container 510 as necessary to compensate for removal of density from the container (e.g., make-up air) and/or the expansion and contraction of the fluids contained within the container 510.

The container 510 further includes a fluid supply module 516 with a base 520 that is coupled to the container 510. The fluid supply module 516 includes a fluid passage that extends from the base 520 to an opening 518. A hose barb extends into the container 510 (see, e.g., hose barb 621 in FIGS. 17-18). When connected to the container 510 as shown, fluid from within the container 510 can be drawn through the fluid passage to the opening 518.

The opening 518 is threaded to correspond with threads on the termination portion 420 of the insert 120. The insert 120 is screwed into the opening 518 to couple the insert 120 to the fluid supply module 516. Other mounting configurations are possible.

In this configuration, the insert 120 is in fluid communication with the fluid in the container 510. The valve 450 closes the insert 120 so that the fluid within the container 510 does not escape until the insert 120 is mated with the body 110.

The termination 240 of the body 110 is connected to tubing 532 that extends to a destination for the fluid, such as an engine of the boat. When the body 110 is connected to the insert 120, the valves 250, 450 are moved to their open positions, thereby allowing fluid to flow from the container 510, through the fluid supply module 516 and insert 120/body 110, and through the tubing 532 to a desired destination.

When the fluid within the container 510 is depleted, the body 110 can be disconnected from the insert 120 by actuating the latch 130 and removing the body 110 from the insert 120. The valves 250, 450 close as the body 110 is removed so that the flow of fluid through the body 110 and the insert 120 is stopped. Once disconnected, the container 510 can be removed and refilled, as needed.

Referring now to FIGS. 17 and 18, an alternative design for a fluid supply module 616 is shown. In this example, the fluid supply module 616 includes an insert module 618 that is configured in manner similar to that of the insert 120 described above. However, the insert module 618 is molded as an integral part of the fluid supply module 616. The insert module 618 is sized to be coupled to the body 110 and includes the valve 250 to allow fluid to flow therethrough.

The fluid supply module 616 also includes a termination 620 that is configured in a manner similar to that of the opening 518. The termination 620 is threaded to allow a legacy fluid line to be connected thereto. The termination 620 can be closed with a plug 622 that is threaded onto the termination 620 when not in use. In this manner, the fluid supply module 616 is configured to allow for backwards compatibility with existing infrastructure.

Referring now to FIGS. 19 and 20, another example of a body 710 is shown. The body 710 is similar to that of the body 110 described above, except that the body 710 is formed of a first portion 715 and a second portion 720. The first and second portions 715 and 720 are affixed to one another to form the body 110.

In one example, the first and second portions 715, 720 are coupled by a welding technique, such as by sonic welding, staking, adhesive, etc., or by insert molding or by pressing or a snap fit. The first and second portions 715, 720 can be made of different materials to accommodate different applications. For example, in one application, the first portion 715 is made of a polymeric material, and the second portion 720 is made of a metal material, such as brass. This allows for the second portion 720 to be more easily terminated for different applications and to be manufactured more cost-effectively. The different materials can also exhibit other benefits, such as added strength and allowance for molding of complete geometries, such as those exhibited by the body. Other configurations are possible.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A male fluid coupling, comprising:
   an insert member defining a bore and a longitudinal axis, the insert member having a front end portion and a termination end portion on opposing ends of the insert member;
   a first seal coupled to the front end portion of the insert member and configured to seal against a female fluid coupling when the male fluid coupling is coupled with the female fluid coupling; and
   a valve positioned within the bore, the valve being biased by a spring to a closed position in which a valve seal coupled to a rear end portion of the valve prevents fluid from flowing through the bore, the valve seal seated against an internal shoulder of the insert member while the valve is in the closed position, the valve seal and the internal shoulder being separated while the valve is in an open position in which fluid can flow through the bore, wherein the valve seal is accessible from the termination end portion of the body, and wherein the valve is retained within the bore of the insert member because the valve seal seats against the internal shoulder,
   wherein the insert member also defines a latch groove configured to receive a latch of the female fluid coupling when the male fluid coupling is coupled with the female fluid coupling, the latch groove extending fully around a circumference of the insert member and having a bottom surface and opposing first and second wall surfaces, the bottom surface of the latch groove: (i) extending longitudinally at a first acute angle relative to the longitudinal axis, (ii) extending at a second acute angle relative to the first wall surface, and (iii) extending at an obtuse angle relative to the second wall surface.

2. The male fluid coupling of claim 1, wherein a beginning of the bottom surface is located more toward the front end portion of the insert member than an end of the bottom surface, and wherein the beginning of the bottom surface has a smaller outer diameter than an outer diameter of the end of the bottom surface.

3. The male fluid coupling of claim 1, wherein the spring is positioned within the bore.

4. The male fluid coupling of claim 1, wherein the first seal is positioned within a first seal groove defined by the front end portion of the insert member.

5. The male fluid coupling of claim 1, wherein the valve seal is positioned with a valve seal groove defined by the valve.

6. The male fluid coupling of claim 1, wherein the valve is configured so that, when the male fluid coupling is coupled with the female fluid coupling, the valve is forced against the bias of the spring to the open position in which fluid can flow through the bore.

7. A fluid coupling system, comprising:
   a female coupling including:
      a body defining an open front end and an opposite termination end, the body defining a longitudinal axis and a fluid passage extending through the body along the longitudinal axis of the body from the front end to the termination end, wherein the body is a single unitary piece;
      a latch member movably coupled to the body and configured to move transversely to the longitudinal axis of the body between unlocked and locked positions;
      a first valve positioned within the body and including a front end portion and a rear end portion, the first valve being movable in relation to the body between an open position in which the fluid passage is open and a closed position in which the fluid passage is closed, the first valve being biased into the closed position; and
      a first valve seal coupled to the rear end portion of the first valve, the first valve seal seated against a shoulder formed by the body while the first valve is in the closed position, the first valve seal and the shoulder being separated while the first valve is in the open position, wherein the first valve seal is accessible from the termination end of the body, and wherein the first valve is retained within the body because the first valve seal seats against the shoulder; and
   a male coupling including an insert member defining a longitudinal axis and including a front end portion sized to be received in the front end of the body, the insert member defining a first seal groove and a latch groove, the latch groove extending fully around a circumference of the insert member and having a bottom surface and opposing first and second wall surfaces, the bottom surface of the latch groove: (i) extending longitudinally at a first acute angle relative to the longitudinal axis of the insert member, (ii) extending at a second acute angle relative to the first wall surface, and (iii) extending at an obtuse angle relative to the second wall surface,
   wherein, while the male and female couplings are operatively coupled together: (i) the latch member is in the locked position and a portion of the latch member is positioned in the latch groove to retain the male and female couplings together, and (ii) depressing the latch member transversely to the longitudinal axis of the body moves the latch member toward the unlocked position and the portion of the latch member out of the latch groove to allow the male and female couplings to be separated.

8. The fluid coupling system of claim 7, wherein the insert member defines a bore and the male coupling includes a second valve positioned within the bore, the second valve being biased by a spring to a closed position in which a second valve seal coupled to a rear end portion of the second valve prevents fluid from flowing through the bore, the second valve seal seated against an internal shoulder of the insert member while the second valve is in the closed position, the second valve seal and the internal shoulder being separated while the second valve is in an open position in which fluid can flow through the bore, wherein the second valve seal is accessible from a termination end portion of the insert member, and wherein the second valve is retained within the bore of the insert member because the second valve seal seats against the internal shoulder.

9. The fluid coupling system of claim 7, wherein a beginning of the bottom surface is located more toward the front end portion of the insert member than an end of the bottom surface, and wherein the beginning of the bottom surface has a smaller outer diameter than an outer diameter of the end of the bottom surface.

10. The fluid coupling system of claim 7, wherein the opposing wall surfaces are parallel to each other.

11. A male fluid coupling, comprising:
an insert member defining a bore and a longitudinal axis, the insert member having a front end portion and a termination end portion on opposing ends of the insert member,
wherein the insert member also defines a latch groove configured to receive a latch of a female fluid coupling when the male fluid coupling is coupled with the female fluid coupling, the latch groove extending fully around a circumference of the insert member and having a bottom surface and opposing opposing first and second wall surfaces, wherein the bottom surface:
(i) is sloped at a first acute angle relative to the longitudinal axis, (ii) extends at a second acute angle relative to the first wall surface, and (iii) extends at an obtuse angle relative to the second wall surface.

12. The male fluid coupling of claim 11, further comprising a first seal coupled to the front end portion of the insert member and configured to seal against the female fluid coupling when the male fluid coupling is coupled with the female fluid coupling.

13. The male fluid coupling of claim 11, further comprising a valve positioned within the bore.

14. The male fluid coupling of claim 13, further comprising a spring, wherein the valve is biased by the spring to a closed position.

15. The male fluid coupling of claim 14, further comprising a valve seal coupled to a rear end portion of the valve, wherein the valve seal seats against an internal shoulder of the insert member while the valve is in the closed position, the valve seal and the internal shoulder being separated while the valve is in an open position in which fluid can flow through the bore.

16. The male fluid coupling of claim 15, wherein the valve seal is accessible from the termination end portion of the body, and wherein the valve is retained within the bore of the insert member because the valve seal seats against the internal shoulder.

* * * * *

UNITED STATES PATENT AND TRADEMARK OFFICE
CERTIFICATE OF CORRECTION

Page 1 of 1

PATENT NO.       : 10,711,931 B2
APPLICATION NO.  : 16/240132
DATED            : July 14, 2020
INVENTOR(S)      : Dennis D. Downs, Gary J. Harris and Grant A. Wilhelm It is certified that error appears in the above-identified patent and that said Letters Patent is hereby corrected as shown below:

In the Claims

Column 7, Line 25 (Approx.), Claim 11, delete "opposing opposing" and insert -- opposing --, therefor.

Signed and Sealed this
Thirteenth Day of October, 2020

Andrei Iancu
*Director of the United States Patent and Trademark Office*